United States Patent
Jing et al.

(10) Patent No.: US 9,060,198 B2
(45) Date of Patent: *Jun. 16, 2015

(54) HOME NETWORK COMPONENT CONTROLLING DATA AND FUNCTION OF ANOTHER HOME NETWORK COMPONENT

(71) Applicants: Sony Corporation, Tokyo (JP); Sony Electronics Inc., Park Ridge, NJ (US)

(72) Inventors: Xiangpeng Jing, San Diego, CA (US); Abhishek P. Patil, San Diego, CA (US); Aixin Liu, San Diego, CA (US); Djung Nguyen, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 160 days.

This patent is subject to a terminal disclaimer.

(21) Appl. No.: 14/013,690

(22) Filed: Aug. 29, 2013

(65) Prior Publication Data

US 2014/0007167 A1    Jan. 2, 2014

Related U.S. Application Data

(63) Continuation of application No. 12/575,789, filed on Oct. 8, 2009, now Pat. No. 8,606,896.

(51) Int. Cl.
*G06F 15/173* (2006.01)
*H04N 21/436* (2011.01)
*H04L 12/28* (2006.01)
*H04M 3/42* (2006.01)
*H04N 21/41* (2011.01)
*H04N 21/478* (2011.01)

(52) U.S. Cl.
CPC ...... *H04N 21/43615* (2013.01); *H04L 12/2809* (2013.01); *H04L 12/282* (2013.01); *H04M 3/42127* (2013.01); *H04M 3/42382* (2013.01); *H04M 2207/12* (2013.01); *H04M 2242/30* (2013.01); *H04N 21/4104* (2013.01); *H04N 21/478* (2013.01)

(58) Field of Classification Search
CPC .................................................. H04M 3/42382
USPC .................................................. 709/223, 226
See application file for complete search history.

(56) References Cited

U.S. PATENT DOCUMENTS

2009/0019141 A1* 1/2009 Bush et al. .................... 709/223

* cited by examiner

*Primary Examiner* — Dustin Nguyen
*Assistant Examiner* — Joel Mesa
(74) *Attorney, Agent, or Firm* — John L. Rogitz

(57) ABSTRACT

Aggregated service and feature sharing is provided in a home network, in which users can freely enjoy not only the shared content, but also the unique features provided by each device anywhere in the network. The service sharing feature allows one device to control and use shared hardware or software functionalities provided by other devices in the network.

23 Claims, 2 Drawing Sheets example overall logic logic for example use case component user interface service user interface (using phone as example) with sub-menus

HOME NETWORK COMPONENT CONTROLLING DATA AND FUNCTION OF ANOTHER HOME NETWORK COMPONENT

FIELD OF THE INVENTION

The present application relates generally to using one component in a home network to enable a user to exploit and control the functions, in addition to the data, in another component of the home network.

BACKGROUND OF THE INVENTION

With the proliferation of home networking technologies (e.g., Gigabit Ethernet, wireless LAN and Bluetooth), most consumer electronics devices now have networking (and wireless) capabilities. Some of the most common devices include PCs, laptops, TVs, smart phones, wireless headset, etc. The ultimate goal of a connected home network is for users to easily access any feature and any content from other devices anywhere, either at home or anywhere with Internet access.

As understood herein, it is desirable not just to access content from one device on another device. A user may also desire to access features/services from, say, a TV that are provided by another component in the home network but not by the TV.

As also understood herein, technologies and applications have been introduced to facilitate content/multi-media aggregation and discovery in home networks, such as DLNA, windows/samba file sharing, Apple Bonjour, etc., but there is still lack of a technology to allow users to easily access and operate on all devices anywhere, that is, service and feature sharing in a home network.

SUMMARY OF THE INVENTION

Accordingly, a system has at least one user component including a processor and a user input device inputting signals to the processor, and at least one service component communicating with the user component over a home network. The service component includes a processor. The processors cooperate to discover each component in the home network, with each processor publishing to the home network services provided by the respective component. Also, each processor receives information indicating services published by components in the network other than the processor receiving information. The user component receives user invocation signals to invoke a service of the service component and the user component also receives user service signals, which it sends over the network to the service component to cause the service component to provide the service in accordance with the user service signals. The user component receives back over the home network a service output from the service component representing a result of executing the service. The service output is presented on the user component.

In some examples the user component presents user interfaces (UI) to permit a user to select, using the user component, a service of the service component and then to invoke and control, by inputting commands to the user component, the service component to execute the service. In some of these examples the user component presents on a display a component screen that lists available discovered components on the network. The user provides input using the component screen to select the service component. In the response to selecting the service component from the user component, the user component may present a list of services provided by service component from which a user can select to cause the service component to execute the service and return results therefrom to the user component over the network.

The service component can be a wireless telephone which provides a call service. Input at the user component is received from an input device associated with the user component to invoke the call service. A sub-menu can be caused to appear on the user component instructing the user to manipulate the input device to input a telephone number to the user component which then sends the number to the telephone through the network to cause the telephone to dial the number, the telephone sending back audio data associated with the call over the network for audible or visual presentation thereof on the user component. The network connecting each component can be any form of network such as Ethernet, Wi-Fi, or Bluetooth link in this case. Also, the telephone can send back a ring tone which is presented on the user component. A user's voice input can be received at the user component and sent to the telephone and thence to a wide area telephony network with a called party's voice being presented on the user component, such that the call service of the telephone is used through the user component.

In other embodiments the service component is a wireless telephone which provides a "retrieve position" service. The user can manipulate an input device associated with the user component to select the retrieve position service. The user component in response sends a message to the telephone over the network to report its position as indicated by a position receiver of the telephone. The position is sent from the telephone to the user component for display thereof on the user component.

The wireless telephone can also provide a "purchase content" service which can be selected by the user to cause a submenu to be presented on the user component instructing the user to input to the user component via the input device purchase information. The user component sends the purchase information to the telephone over the home network and in response the telephone transmits an order for content over a wide area telephony network.

The wireless telephone may in addition or alternatively provide a short message text service selectable by the user at the user component to cause a submenu to be presented on the user component instructing the user to input to the user component via the input device a phone number and text message using the input device. The information input to the user component can be sent over the home network to the telephone which dials the number and sends the message received from the user component.

The service component may include a camera and provide a picture taking service. The user can manipulate an input device associated with the user component to select the picture taking service. A submenu can be presented on the user component instructing the user to input to the user component via the input device a take picture signal, which is sent to the service component to cause the service component to capture an image. Images from the service component can be sent over the network to the user component for display thereof on the user component. As an alternative, the webcam service can be shared by a component which can stream real-time videos from one component to another.

In another aspect, a method includes presenting on a TV content viewable by a user, and enabling the user to input to the TV service control signals to control services provided uniquely by other components communicating with the TV over a home network. The services include one or more of adjusting settings of a component, accessing GPS location information of a mobile telephone, purchasing and downloading music/movies, sending text messages via a telephone, establishing content syncing for all components in a home network from any component in the network a user may choose, turning on/off a camera, taking a picture on a telephone or computer and sending the picture back to the TV for presentation thereof on the TV, or remotely retrieving voicemail messages on a telephone.

In another aspect, a method includes providing plural components in a home network, and providing aggregated service and feature sharing in the home network. Users can freely enjoy not only the content, but also the unique features provided by each component from a user component anywhere in the network.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
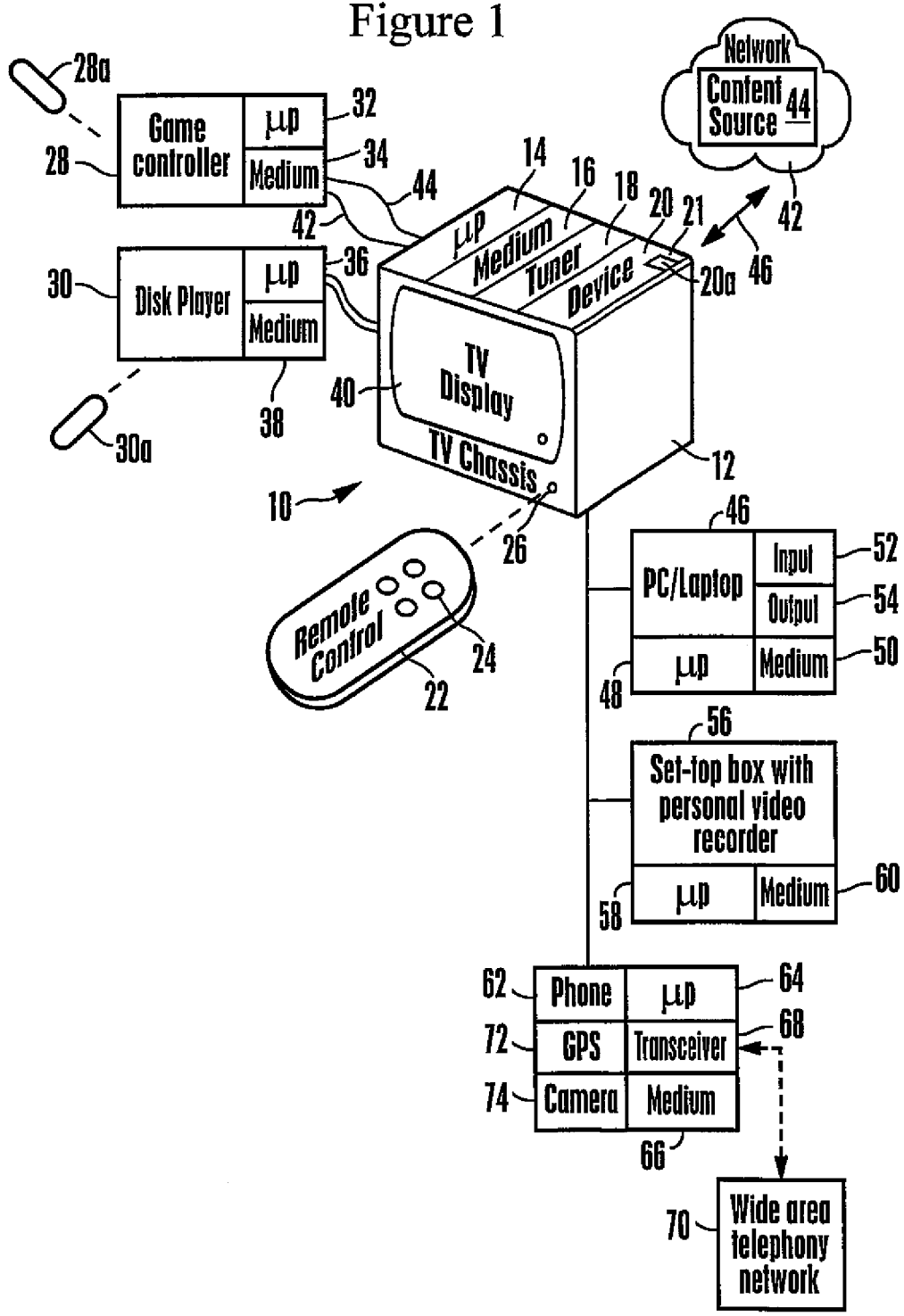
FIG. 1 is a block diagram of an example TV system in accordance with present principles.

Referring initially to FIG. 1, home network 10 includes a TV chassis 12 holding a TV processor 14 accessing a computer-readable storage medium 16 such as disk-based or solid state storage that can be non-volatile memory (NVM). The medium 16 may bear a software-implemented network manager module executable by the TV processor 14 alone or acting in concert with the below-described network interface processor to undertake logic herein. Furthermore, the medium 16 may bear software executable by the TV processor 14 to enable reception and display of Internet content on the TV.

The chassis 12 may also hold a TV tuner 18 communicating TV signals to the TV processor 14. There need be only a single analog/digital TV tuner 18 provided in the TV system 10, it being understood that the single analog/digital TV tuner 18 may be physically implemented by one and only one combined digital/analog tuner or by a single digital tuner or by one and only one digital tuner in combination with one and only one analog tuner. In other embodiments only a single analog tuner and no digital tuners may be provided. The tuner 18 may be provided in the chassis 12 or in a set-top box, and the tuner 18 may receive TV signals from a satellite, cable head end, terrestrial broadcast antenna, etc.

A network interface device 20 such as but not limited to an Internet enabled wireless modem may be provided to send Internet signals to the TV processor 14. The device 20 typically includes a processor 20a and a lower level wireless driver 21 that is programmed to gather link quality information including one or more of wireless signal strength, data rate, packet loss, and streaming delay. The interface device 20 may be supported by the TV chassis 12 or it may be external to the chassis but communicating with the TV processor 14. Without limitation the network interface 20 may be an IEEE 802.11a/b/g/n transceiver, a 60 GHz wireless transceiver, or other transceiver that can stream high quality multimedia content.

As shown, the home network 10 also includes a portable hand-holdable TV remote control (RC) 22. The RC 22, among other things, can have cursor control keys 24 for sending wireless signals to a receiver 26 on the chassis 12. The signals detected by the receiver 26 are sent to the TV processor 14.

In some embodiments the home network 10 may receive video from a game console 28 such as but not limited to a console in the Sony Playstation® family and/or from a digital disk player 30 such as a Blu Ray® disk player. The console 28 typically includes a game processor 32 accessing a game storage medium 34 storing audio and/or video data and likewise the disk player 30 typically includes a disk processor 36 accessing a disk storage medium 38 storing audio and/or video data. The game console can have a game remote control 28a and the disk player can be associated with a wireless disk player remote control 30a.

Content from the TV tuner 18 or Internet content downloaded from the network interface 20 and, when provided, content from the game console 28/disk player 30 may be presented under control of the TV processor 14 on a TV display 40 such as but not limited to a plasma display or flat panel matrix-type display, either standard definition (SD) and/or high definition (HD).

In one example embodiment the components shown in FIG. 1 communicate multimedia data to each other over high definition multimedia interface (HDMI) links 42, and the components also communicate control data over consumer electronics control (CEC) links 44 that typically accompany HDMI links. In the example non-limiting architecture shown in FIG. 1 the TV 12 is the central node of the network but it is to be understood that all components may be linked together directly or only some components may be linked together directly, with communication to other components potentially passing through intervening components. The links may be wired or wireless.

FIG. 1 shows that the TV can wirelessly receive multimedia data such as audio, video, or still picture data from a network 42 that includes one or more content sources 44 that typically are shared within the home network. The network 42 may be the Internet and the sources 44 may be established by authorized user devices that stream content over wireless links 46 to the TV for reception thereof by the wireless interface 20.

Additionally, the home network 10 may include a user computer 46 such as a personal computer (PC) or laptop with computer processor 48 and associated tangible computer readable storage medium 50. The user computer 46 also includes one or more input devices 52 such as keyboards, mice, etc. and one or more output devices 54 such as monitors, printers, etc.

The home network 10 may further include a set-top box 56 containing a personal video recording (PVR) device such as a hard disk drive. The STB 56 includes a STB processor 58 and one or more computer readable storage media 60.

In the implementation shown in FIG. 1 the network 10 also includes a wireless telephone 62 including a phone processor 64 accessing a computer readable storage medium 66 to control a wireless telephony transceiver 68 such as but not limited to a global systems for mobile communications (GSM) transceiver or code division multiple access (CDMA) transceiver or variants thereof. The phone 62 communicates wirelessly with a wide area telephony network 70 using the transceiver 68. The phone 62 may also include additional sub-components such as but not limited to a position receiver 72, e.g., a global position satellite (GPS) receiver, and a typically digital camera 74 that may generate both moving and still images.

The components 46, 56, 62, like, e.g., the game controller 28, may be housed separately from the TV, i.e., are standalone components.

Figure 2:
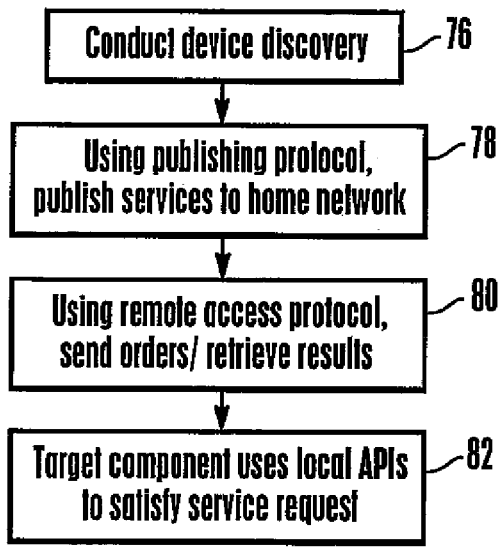
FIG. 2 is example overall logic that may be executed in accordance with present principles.

Turning now to FIG. 2, example overall logic can be seen to enable a component in FIG. 1 such as the TV to not only access data in another home network component but to also control the other component to exploit features/services of the other component to achieve the goal of "access anything anywhere". By way of non-limiting example, the table below shows illustrative features/services provided by various components in FIG. 1 that can be accessed and exploited from other components in the home network 10.

| Smart Phone | PC/Laptop | TV/Set-top-box | PlayStation |
|---|---|---|---|
| GPS location information | Incoming email reminder | TV/IPTV program recording | Remote game/movie purchasing & downloading |
| Remote content purchasing/downloading | Remote storage Content syncing | Favorite channel settings | Online gaming scheduler |
| Send/receive SMS messages | Camera operation Printer sharing | Channel tuning timer/reminder | Game console emulator |
| Content syncing | | | |
| Voicemail retrieving | | | |
| Camera operation | | | |

Commencing at block 76 in FIG. 2, components in the network 10 discover each other using device discovery principles. Device discovery may be limited to discovering components physically inside the home hosting the home network 10, or may be expanded to discover devices (e.g., the source 44) roaming physically outside the home but communicating with the network 10 over the Internet.

Proceeding to block 78, a service publishing protocol is used by each component participating in the discovery process to publish self-services, with a service discovery protocol being used by each component participating in the discovery process to discover services published by other devices. These protocols may be any suitable system in which a device, ordinarily pursuant to device discovery, either informs a central node, e.g., the TV, of its services and retrieves from the central node a list of other home network components and associated services, or in which each device actively announces a list of its services directly to the network and requests from each component a list of that component's services in a one-to-one basis. A list of the parameters associated with a particular service can also be exchanged during this stage.

Moving to block 80, a remote access protocol is used to put orders to use one or more services of another home network component whose services have been discovered and to receive back service results from that component. The remote access protocol may simply be a system to enable user commands received at one component to be sent to another component, with the APIs discussed below then being executed to comply with the commands. The remote access protocol may also be used to build communication pipe if the result is a stream.

Block 82 indicates that a target component, i.e., a component of the home network 10 receiving a service request from another component in the network, executes one or more application-specific interfaces (APIs) that typically are specific to and provided by each device to support sharing of available services/features to satisfy the service request. The APIs may include user interfaces (UI), examples of which are provided below, to permit a user to select, on a first component, a service of a second component and then to invoke and control, by inputting commands to the first component, the second component to execute the service. Because of the limitation of some hardware resources (e.g., camera/GPS driver) or some service security considerations (e.g., purchasing account management), the available local APIs may differ for different target devices. The specific implementation of each API may be derived from principles disclosed herein and typically depend on the specific platform used. The definition of those common APIs may be distributed to various device vendors for specific implementation.

Figure 3:
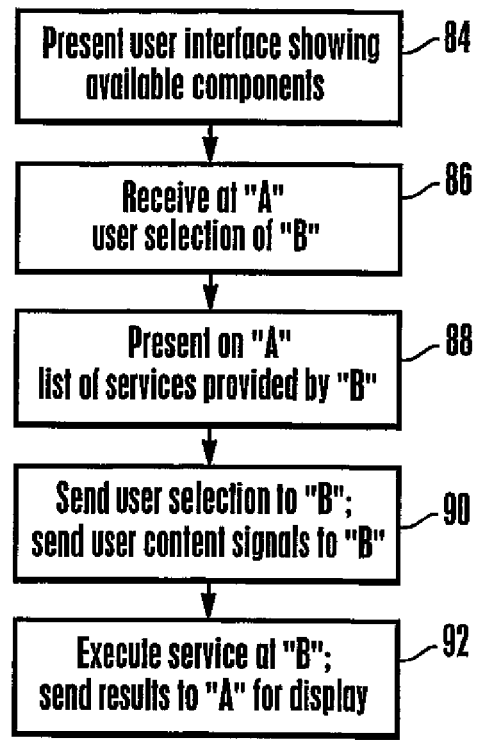
FIG. 3 is example logic for a use case scenario.

Now referring to FIG. 3, a component screen may be entered from a setup mode on the TV or other user node "A" that the user may define, e.g., the PC 46, which is a UI that lists available discovered components on the network 10. Assume a user selects, using an input device associated with the node "A" (the RC 22 for example), component "B" from the list at block 86. The component "B", once selected, thus establishes what might be thought of as a service node.

At block 88 a list of services provided by component "B" (service node) is presented on the user node "A", e.g., the TV. Should a user select a service of "B" using the input device of the node "A", the user selection is sent at block 90 from component "A" to component "B", with subsequent user control signals associated with the service also being received at "A" and sent to "B". The service is executed at block 92 by the service node "B" under control of service input from the user node "A", with results of the service being returned to the user node "A" for presentation thereof on a display of the user node.

Figure 4:
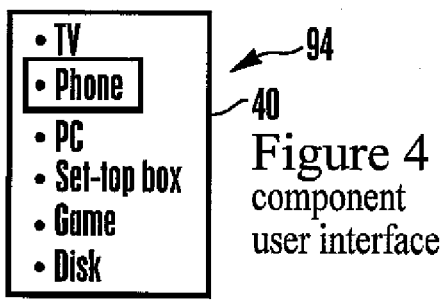
FIG. 4 is a screen shot of an example component list user interface (UI)

FIG. 4 illustrates an example component list UI 94 that may be presented on, e.g., the TV display 40 at block 84 of FIG. 3. As shown, the UI 94 lists the components shown in FIG. 1. As indicated by the box around "phone", for example purposes the user has selected the "phone" 62 in FIG. 1 at block 86 in FIG. 3.

Figure 5:
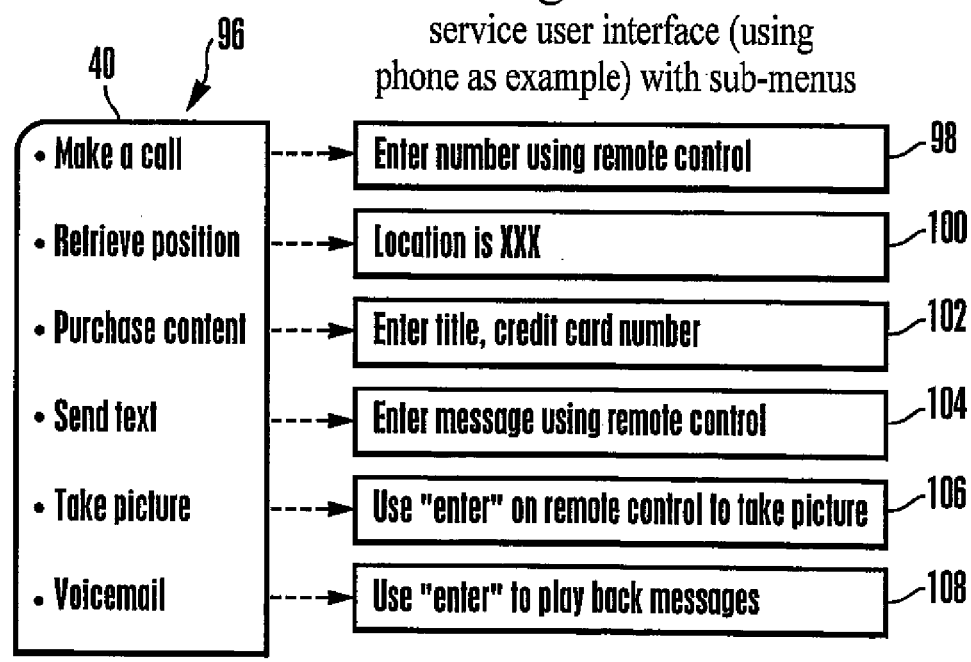
FIG. 5 is a screen shot of an example service list UI shown in conjunction with sub-menus corresponding to entries on the service list.

As mentioned above, selection of a component causes a service UI to be presented at block 88 in FIG. 3 for the selected service node, and FIG. 5 shows an example service UI 96 that may be presented on the display of the user node (in this example, the TV display 40) listing the services of the selected service node. FIG. 5 shows an example of a phone service UI since "phone" was hypothesized as being selected in FIG. 4. As shown, the example services provided by the phone 62 include "make a call". Assuming the TV is the user node, and should the user manipulate the RC 22 associated with the TV to select this entry, a sub-menu 98 appears instructing the user to manipulate the RC 22 of the TV to input a telephone number to the TV, which then, as explained above, sends the number to the phone 62 through the network 10 to cause the API at the phone 62 to dial the number.

In turn, the phone 62 sends back audio data associated with the call over the network 10, for audible or visual presentation thereof on the TV. For example, the phone 62 can send back a ring tone which is presented on the speakers of the TV and/or which is presented as a message "ringing" on the TV display 40. The user may speak into a microphone associated with the TV to participate in the call, with the voice signal received at the TV being sent to the phone 62 and thence to the wide area telephony network and with called party's voice being presented on the TV speakers. In this way, the call service of the phone 22 is used through the TV.

Additionally, the example services provided by the phone 62 can include "retrieve position" service during a call to obtain the location of a remote phone. Assuming the TV is the user node, and should the user manipulate the RC 22 associated with the TV to select this entry, the TV sends a message to the phone over the network 10 to request the location information of a remote phone connecting by the telephone network. The remote phone can report its position as indicated by the position receiver 72. The position is shown on a sub-menu 100 on the TV display 40.

Another example service provided by the phone 62 that can exploited from the user node (e.g., from the TV) might be "purchase content". If the user selects this entry using the TV RC 22 a submenu 102 can appear instructing the user to input to the TV via the RC 22 purchase information, such as, e.g., content title, credit card number, etc. The TV sends this information to the phone 62 over the home network 10 and in response the phone 62 invokes a purchase API resident on the phone to cause the phone 62 to transmit an order for content over the wide area telephony network to a user-input telephone number, a service provider telephone number programmed into the phone, or other appropriate purchasing source.

If the phone 62 can be used to send text and the user selects this option using the RC 22, a submenu 104 can be presented on the TV display 40 instructing the user to input a phone number and text message using the RC 22. The information input to the TV is sent over the home network 10 to the phone 62, which dials the number and sends the message received from the TV.

If the phone 62 has the capability to take a picture the user may select this option from the UI 96 and be presented with a submenu 106 instructing the user to, e.g., depress an "enter" key on the RC to cause the phone 62 to operate its camera 74 to take a photograph or video. To this end, when the "picture" entry is selected, the TV can send a request to the phone 62 over the network 10 to send back to the TV the current image from the camera 74, for presentation thereof on the display 40. The user can view the image and at the desired moment, input a shutter command as described to the TV, which is sent to the phone to capture the image.

The user may select a voicemail option from the UI 96, causing a submenu 108 to be presented on the display 40 instructing the user to manipulate the RC 22 to retrieve messages. In response to a retrieve signal input using the RC 22 to the TV, the TV sends a "check voicemail" command to the phone 62 over the network 10. The phone 62 retrieves its messages and sends them back to the TV over the network 10 for audible and/or visual presentation thereof on the TV.

Accordingly, it may now be appreciated that, as examples, a user viewing the TV can not only browse content such as photos, music, and movies stored on other components in the network 10, but also to control services and features provided uniquely by the other components, such as adjusting settings of a device controlled from another one, accessing GPS location information of a phone (which is connected remotely outside a home), purchasing and downloading music/movies directly to a phone or PC from a TV, sending a text message (SMS) to friends via a phone but controlled from a TV or PC, starting content syncing for all devices at home from any device a user may choose, turning on/off the webcam and taking a picture on a phone or PC and sending back to a TV, remotely retrieving voicemail or multimedia messages on a phone, etc. The above applications of controlling a service provided by one component in a home network from another component in a home network are illustrative only and non-limiting. Thus, aggregated service and feature sharing is provided in a home network, in which users can freely enjoy not only the content, but also the unique features provided by each device anywhere.

While the particular HOME NETWORK COMPONENT CONTROLLING DATA AND FUNCTION OF ANOTHER HOME NETWORK COMPONENT is herein shown and described in detail, it is to be understood that the subject matter which is encompassed by the present invention is limited only by the claims.

What is claimed is:

1. System comprising:
   at least one computer memory that is not a transitory signal and that comprises instructions executable by at least one component processor of a user component for:
   communicating with at least one service component over a home network, the service component including a processor, wherein the instructions when executed by the component processor of the user component configure the component processor to cooperate with the processor of the server component for:
   facilitating discovery of each component by the other component in the home network;
   publishing to the home network services provided by the user component and receiving information indicating services published by the service component in the network;
   receiving user invocation signals to invoke a service of the service component;
   receiving user service signals and sending the user service signals over the network to the service component to cause the service component to provide the service in accordance with the user service signals;
   receiving back over the home network a service output from the service component representing a result of executing the service for presentation of the service output on the user component;
   in response to entry via a user interface (UI) of a selection of the service component, presenting on the user component a list of services provided by the service component from which a user can select to cause the service component to execute the service and return results therefrom to the user component over the network.

2. The system of claim 1, wherein the instructions are executable to present user interfaces (UI) to permit selection, using the user component, a service of the service component and then to invoke and control, by commands to the user component, the service component to execute the service.

3. The system of claim 1, wherein the instructions are executable to present on a display the UI, the UI being a component screen that lists available discovered components on the network, input being receivable using the component screen to select the service component.

4. The system of claim 1, wherein the service component is a wireless telephone and provides a call service, the instructions being executable to:
   receive input to invoke the call service, present a sub-menu on the user component instructing to input a telephone number to the user component, send the number to the telephone through the network to cause the telephone to dial the number, present audio data associated with the call received from the telephone over the network for audible or visual presentation thereof on the user component.

5. The system of claim 4, wherein the instructions are executable to receive from the telephone a ring tone which the processor of the user component when executing the instructions is further configured to present on the user component, the instructions being executable to receive a user's voice input and send to the telephone the user's voice input with a called party's voice being presented on the user component, such that the call service of the telephone is usable through the user component.

6. The system of claim 1, wherein the service component is a wireless telephone and provides a "retrieve position" service selectable on the user component instructions being executable to, in response sending a message to the telephone over the network, report its position as indicated by a position receiver of the telephone, the position being receivable from the telephone by the user component for display thereof on the user component.

7. The system of claim 1, wherein the service component is a wireless telephone and provides a "purchase content" service, the instructions being executable to:

receive a selection of the purchase content service, present a submenu on the user component to receive input of purchase information, send the purchase information to the telephone over the home network such that in response the telephone can transmit an order for content over a wide area telephony network.

8. The system of claim 1, wherein the service component is a wireless telephone and provides a short message text service, the instructions being executable to:

receive a selection of the text service, present a submenu on the user component to receive a phone number and text message, send the information input to the user component over the home network to the telephone to cause the telephone to dial the number and send the message received from the user component.

9. The system of claim 1, wherein the service component includes a camera and provides a picture taking service, the instructions being executable to:

receive a selection of the picture taking service, present a submenu enabling generation of a take picture signal, send the take picture signal to the service component to cause the service component to capture an image or a video, receive images from the service component over the network for display thereof on the user component.

10. System comprising:

at least one computer memory that is not a transitory signal and that comprises instructions executable by at least one processor of at least one user component for:

communicating with at least one service component over a home network, the service component including a processor, wherein the instructions are executable to cooperate with the processor of the server component to:

facilitate discovery of each component by the other component in the home network;

publish to the home network services provided by the respective user component and receiving information indicating services published by the service component in the network;

receive user invocation signals to invoke a service of the service component;

receive user service signals and send the user service signals over the network to the service component to cause the service component to provide the service in accordance with the user service signals;

receive back over the home network a service output from the service component representing a result of executing the service for presentation of the service output on the user component; and in response to receiving a selection of the service component from the user component, present a list of services provided by the service component from which a user can select to cause the service component to execute the service and return results therefrom to the user component over the network.

11. The system of claim 10, wherein the service component is a wireless telephone and provides a call service, the instructions being executable to:

receive input from the user component to invoke the call service, present a sub-menu on the user component to receive input of a telephone number, send the number to the telephone through the network to cause the telephone to dial the number, present audio data associated with the call received from the telephone over the network for presentation thereof on the user component.

12. The system of claim 11, wherein the instructions are executable to:

receive from the telephone a ring tone, present the ring back tone on the user component, receive a user's voice input, and send to the telephone the user's voice input with a called party's voice being presented on the user component, such that the call service of the telephone is usable through the user component.

13. The system of claim 10, wherein the service component is a wireless telephone and provides a "retrieve position" service, the user being permitted to manipulate an input device associated with the user component to select the retrieve position service, the instructions being executable to, in response sending a message to the telephone over the network, report a position as indicated by a position receiver of the telephone, the position being receivable from the telephone by the user component for display thereof on the user component.

14. The system of claim 10, wherein the service component is a wireless telephone and provides a "purchase content" service, the instructions being executable to:

receive a selection of the purchase content service, present a submenu on the user component through which to receive purchase information, send the purchase information to the telephone over the home network such that in response the telephone can transmit an order for content over a wide area telephony network.

15. The system of claim 10, wherein the service component is a wireless telephone and provides a short message text service, the instructions being executable to:

receive a selection of the text service, present a submenu on the user component to receive a phone number and text message, send the information input to the user component over the home network to the telephone to cause the telephone to dial the number and send the message received from the user component.

16. The system of claim 10, wherein the service component includes a camera and provides a picture taking service, the instructions being executable to:
receive a selection of the picture taking service,
present a submenu through which a take picture signal can be generated,
send the take picture signal to the service component to cause the service component to capture an image or a video,
receive images from the service component over the network for display thereof on the user component.

17. System comprising:
at least one computer memory that is not a transitory signal and that comprises instructions executable by at least one processor of at least one service component for:
communicating with at least one user component over a home network, the user component including a processor, wherein the instructions are executable to:
facilitate discovery of each component by the other component in the home network;
publish to the home network services provided by the service component and receive information indicating services associated with the user component in the network;
receive user invocation signals to invoke a service of the service component;
receive user service signals over the network from the user component to provide using the service component the service in accordance with the user service signals; and
send back over the home network a service output from the service component representing a result of executing the service for presentation of the service output on the user component, wherein in response to a signal indicating selection of the service component, the instructions are executable to send to the user component a list of services provided by the service component from a service is selectable to cause the service component to execute the service and return results therefrom to the user component over the network.

18. The system of claim 17, wherein the service component is a wireless telephone and is configured to provide a call service selectable by a user of the user component.

19. The system of claim 17, wherein the service component is a wireless telephone and is configured to provide a "retrieve position" service to the user component.

20. The system of claim 17, wherein the service component is a wireless telephone and is configured to provide a "purchase content" service to the user component.

21. The system of claim 17, wherein the service component is a wireless telephone and is configured to provide a short message text service to the user component.

22. The system of claim 17, wherein the service component includes a camera and is configured to provide a picture taking service to the user component.

23. Method comprising:
discovering each of a user component and a service component in a home network;
publishing to the home network services provided by the respective components;
receiving information indicating services published by components in the home network other than the component receiving information;
receiving user invocation signals to invoke a service of the service component;
receiving user service signals and sending the user service signals over the network to the service component to cause the service component to provide the service in accordance with the user service signals; and
receiving back over the home network a service output from the service component representing a result of executing the service, the service output being configured for being presented on the user component, wherein in response to selecting the service component from the user component, the user component is configured to present a list of services provided by the service component from which a user can select to cause the service component to execute the service and return results therefrom to the user component over the network.

* * * * *